United States Patent
Choi

(10) Patent No.: US 11,722,466 B2
(45) Date of Patent: Aug. 8, 2023

(54) METHODS FOR COMMUNICATING DATA UTILIZING SESSIONLESS DYNAMIC ENCRYPTION

(71) Applicant: National Technology & Engineering Solutions of Sandia, LLC, Albuquerque, NM (US)

(72) Inventor: Sung Nam Choi, Sandia Park, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 123 days.

(21) Appl. No.: 17/370,769

(22) Filed: Jul. 8, 2021

(65) Prior Publication Data

US 2022/0006793 A1 Jan. 6, 2022

Related U.S. Application Data

(63) Continuation of application No. 15/286,344, filed on Oct. 5, 2016, now Pat. No. 11,070,532, which is a continuation-in-part of application No. 15/183,454, filed on Jun. 15, 2016, now Pat. No. 10,541,996.

(60) Provisional application No. 62/237,253, filed on Oct. 5, 2015.

(51) Int. Cl.
| | |
|---|---|
| *H04L 9/06* | (2006.01) |
| *H04L 9/32* | (2006.01) |
| *H04L 9/40* | (2022.01) |
| *H04L 9/08* | (2006.01) |

(52) U.S. Cl.
CPC ........ *H04L 63/0435* (2013.01); *H04L 9/0643* (2013.01); *H04L 9/0866* (2013.01); *H04L 9/0869* (2013.01); *H04L 9/3236* (2013.01); *H04L 63/06* (2013.01); *H04L 63/083* (2013.01); *H04L 63/0853* (2013.01); *H04L 2209/24* (2013.01)

(58) Field of Classification Search
CPC ... H04L 9/0866; H04L 9/3236; H04L 9/3278; H04L 9/0643; H04L 9/0869; H04L 63/0435; H04L 63/06; H04L 63/083; H04L 63/0853; H04L 2209/24
See application file for complete search history.

(56) References Cited

U.S. PATENT DOCUMENTS

| | | | | |
|---|---|---|---|---|
| 2002/0094085 | A1* | 7/2002 | Roberts | H04L 9/0869 380/263 |
| 2012/0131340 | A1* | 5/2012 | Teuwen | H04L 9/3273 713/168 |
| 2014/0365782 | A1* | 12/2014 | Beatson | G06F 21/72 713/186 |
| 2015/0006880 | A1* | 1/2015 | Alculumbre | H04L 9/0825 713/153 |

* cited by examiner

Primary Examiner — Daniel B Potratz
(74) Attorney, Agent, or Firm — Daniel J. Jenkins

(57) ABSTRACT

The present disclosure is directed to methods that provide a secure communication protocol by utilizing one step process of authenticating and encrypting data without having to exchange symmetric keys or needing to renew or re-issue digital identities fundamental to asymmetric encryption methodology.

10 Claims, 1 Drawing Sheet

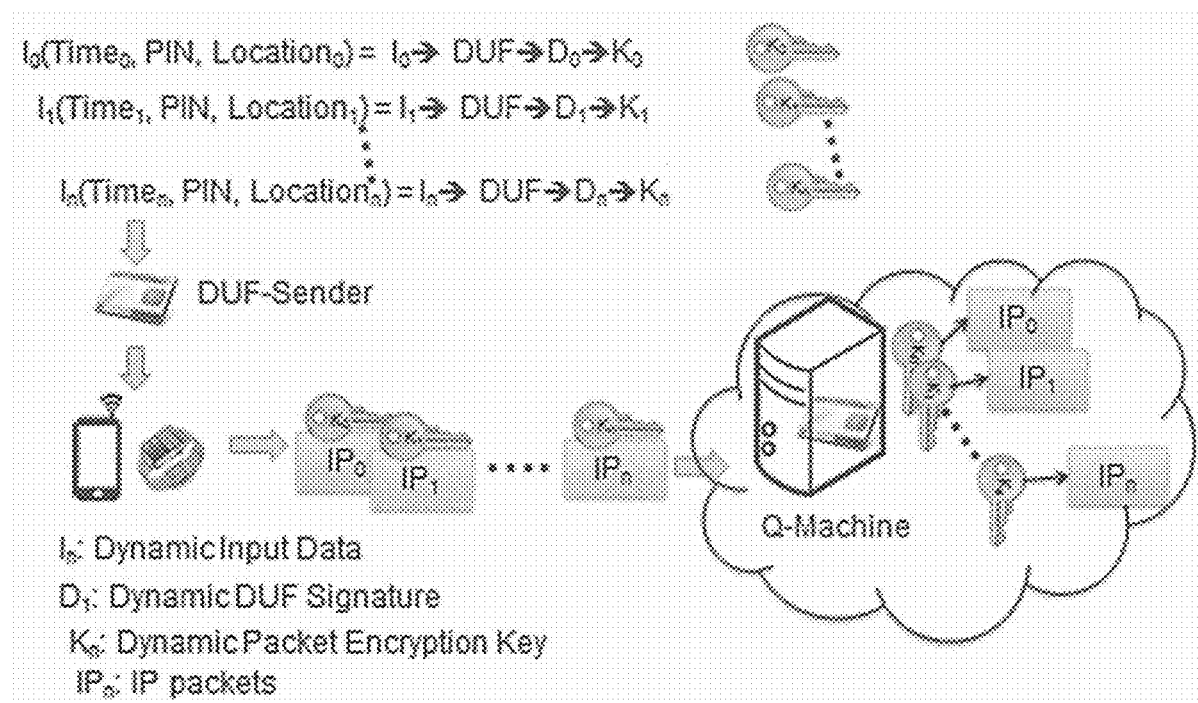

METHODS FOR COMMUNICATING DATA UTILIZING SESSIONLESS DYNAMIC ENCRYPTION

CROSS-REFERENCE TO RELATED APPLICATIONS

This application is a continuation of U.S. patent application Ser. No. 15/286,344, entitled "Methods for Communicating Data Utilizing Sessionless Dynamic Encryption," by Sung Nam Choi, filed on Oct. 5, 2016, which claims priority to provisional patent application U.S. Ser. No. 62/237,253, entitled "Systems and Methods for Communicating Data Utilizing Dynamic Encryption," by Sung Nam Choi, filed Oct. 5, 2015, and is a continuation-in-part of U.S. patent application Ser. No. 15/183,454, entitled "Methods and Systems for Authenticating Identity," by Choi et al., filed Jun. 15, 2016, the disclosures of which are incorporated herein by reference in their entireties.

STATEMENT CONCERNING FEDERALLY-SPONSORED RESEARCH

This invention was developed under Contract DE-AC04-94AL85000 between Sandia Corporation and the United States Department of Energy and under Contract No. DE-NA0003525 awarded by the United States Department of Energy/National Nuclear Security Administration. The U.S. Government has certain rights in this invention.

FIELD OF THE INVENTION

The present disclosure is directed towards secure communication, more particularly, the present disclosure is directed to an encryption protocol that includes a mechanism for creating a cryptographically secured, sessionless connection between two parties.

BACKGROUND OF THE INVENTION

Asymmetric encryption such as RSA algorithm that is heavily based on securely distributing and maintaining static-digitized encryption keys. Secure communication protocols built on asymmetric algorithms, such as SSL/TLS, are known to be susceptible to quantum computing since 1994 (Shor's Proof). Current development occurring in quantum computing industry has significantly increased the potential susceptibility of SSL/TLS to quantum-crypto-analysis. Furthermore, asymmetric algorithm places heavy processing demands on computing resources, as well as very expensive security cost of distributing and maintaining the encryption keys. What is needed are systems, methods and protocols that can provide not only secure communications but cost effective, simple to manage and maintain encryption key management process.

BRIEF DESCRIPTION OF THE DRAWINGS

FIG. 1 illustrates a process flow for a dynamic packet encryption protocol according to an embodiment of the disclosure.

Wherever possible, the same reference numbers will be used throughout the drawings to represent the same parts.

SUMMARY

According to the present disclosure, methods are disclosed that provide secure communication protocols by utilizing one step process of authenticating and encrypting data with constantly changing encryption keys all in one process without ever having to initiate exchanging of session keys.

The disclosed methods incorporate a Digitally Unclonable Function (DUF) to uniquely identify electronic device as well as owners of the device by using a secure authentication protocol. Once communicating entities are securely registered with a DUF protocol, the DUF is modified to provide a mechanism for establishing a cryptographically secured connection between two parties, without ever having to exchange session keys. This DUF modified secure communication is hereafter referred to as a Dynamic Packet Encryption Protocol (DPEP). This technique is an excellent alternative to SSL/TLS protocols which are known to be highly susceptible to quantum crypto-analysis attack.

DETAILED DESCRIPTION

Digitally Unclonable Function (DUF) is designed to provide an unclonable digital ID that is fixed to a unique physical device. In an embodiment, DUF is used as a secure communication protocol by utilizing one step process of authenticating and encrypting data all in one process without ever having to exchange session keys. DUF is modified into a secure communication protocol, which may be referred to as Dynamic Packet Encryption Protocol (DPEP).

DPEP utilizes a DUF protocol process that includes capturing and escrowing a unique physical event, such as, but not limited to a hand signature, localized electromagnetic signature, specific state of biometric parameters, on a tamper resistant digital device(s) issued to end-user/owner and specialized client escrowing device, which may be referred to as a Q-machine, at a secure data center.

FIG. 1 illustrates a process flow for a dynamic packet encryption protocol according to an embodiment of the disclosure. A dynamic data, Jo, is generated and allowed to interact with a DUF device which uniquely modifies the Jo data specific to DUF device. This modified Jo data is then put through digital hash algorithm creating unique Jo and digitally watermarked unique to DUF device. This dynamic signature data is then used as a "seed" to generate dynamic symmetric encryption key ($K_0$). The end user will encrypt his/her data ($D_0$) with $K_0$ and send the encrypted data along with clear text data of DUF device and device owner ID.

The Q-machine uses the same $I_0$ data and puts it through the Q-machine to generate a DUF signature that generates a dynamic symmetric encryption key, which may be referred to as $K_0$. The $K_0$ key is used to decrypt the message sent from the client. If the Q-machine is able to successfully decrypt the data using Q-machine generated dynamic key, it has the assurance that a received message was sent by a legitimate DUF device and its owner.

If a client wants to send $D_1$ (see FIG. 1), the client uses Ii to generate $K_1$ encryption key to encrypt $D_1$. The Q-machine will do the same to simply decrypt the data using Q-machine generated $K_1$ key.

There is no session "key exchange" process, nor is there separate identity verification process. The recipient, simply by being able to successfully decrypt the data sent from the end-user, the identities (the end-user's identity and the end-user's device) is verified. Furthermore, DPEP can use different encryption key for every packet of data without ever having to tell the receiving end the key it is using. It does not have to rely on "one same session" key for securing the communication channel. DPEP protocol can encrypt every packet with different encryption keys. Q-Machine can decrypt each encrypted packet with its own generated but matching decryption keys.

DPEP does not depend on asymmetric algorithms (e.g., RSA, DH, ECC) for creating secure communication channel like SSL/TLS protocol which are susceptible to quantum crypto-analysis. Furthermore, DPEP significantly streamlines establishing secure communication line by taking care of identity verification, key exchange, and encryption all in one step process.

Symmetric Encryption, Asymmetric Encryption, and Hashes

In order to secure the transmission of information, DUF employs a number of different types of data manipulation techniques at various points in the transaction. These include forms of symmetrical encryption, hashing and physical watermarking technique.

Symmetrical Encryption

Symmetrical encryption is a type of encryption where one key can be used to encrypt messages to the opposite party, and also to decrypt the messages received from the other participant using the same encryption key. This means that anyone who holds the key can encrypt and decrypt messages to anyone else holding the key.

This type of encryption scheme is often called "shared secret" encryption, or "secret key" encryption. There is typically only a single key that is used for all operations.

Unlike other secure communication protocols (SSL/TLS/SSH) where symmetric keys are used in order to encrypt the entire connection/session, DPEP can be deployed as "session-less/packet-by-packet unique encryption" keys. Commonly used public/private asymmetrical key pairs in SSL/TLS protocol, happens to use asymmetric algorithm for authentication purposes primarily. It is not utilized as encrypting the session connection.

The DUF client and Q-server both independently generates encryption keys based on DUF protocol, and the resulting secret is never known to outside parties. The secret key is created through a process known as a DUF watermarking process. There is no need for exchanging session keys since both DUF client/sender and Q-server will automatically able to self-generate the symmetric keys based on pre-shared DUF watermarking technique. Both the server and client arrive at the same dynamically changing keys independently by utilizing certain pieces of DUF physical identity and manipulating them with tamper sealed water-marking technique. This process is explained in greater detail in non-provisional DUF patent application.

The symmetrical encryption key used by this procedure is sessionless and constitutes the actual packet/multiple packet level encryption for the data sent between server and client. For DPEP, there is no need to establish connection/session. Every data packets can be encrypted with different encryption keys generated by DPEP protocol. The recipient decrypts and authenticates the client in one step process without ever having to create the connection session and exchange encryption session key.

DPEP can be configured to utilize a variety of different symmetrical cipher systems, including AES, Blowfish, 3DES, CAST128, and Arcfour. The server and client can both decide on a list of their supported ciphers. This means that if two machines are connecting to each other, the default ciphers must be assumed since they will always use the agreed upon cipher to encrypt their packets.

Asymmetrical Encryption

Asymmetrical encryption as utilized in SSL/TLS protocols is primarily used to authenticate the communicating entities as well as exchanging the session key for secure communication. DPEP does not use asymmetric algorithm in any flavor . . . only hashing and symmetric encryption is utilized.

Hashing

Another form of data manipulation that DUF/DPEP takes advantage of is cryptographic hashing. Cryptographic hash functions are methods of creating a succinct "signature" or summary of a set of information. Their main distinguishing attributes are that they are never meant to be reversed, they are virtually impossible to influence predictably, and they are practically unique.

Using the same hashing function and message should produce the same hash; modifying any portion of the input data should produce an entirely different hash. A user should not be able to produce the original message from a given hash, but they should be able to tell if a given message produced a given hash.

Given these properties, hashes are mainly used for data integrity purposes and to verify the authenticity of communication. The main purpose of using hash algorithm in DUF water-marking is to eliminate any physical connection to DUF hardware attributes from external systems. These are used to ensure that the received message text is uniquely from DUF device and the contents are unmodified.

As part of the DPEP symmetrical encryption negotiation outlined above, the algorithm of either client or recipient is either chosen or predetermined. Each message packet that is sent is encrypted with the unique dynamic key. An encrypted data, device and device owner identifier is sent to the recipient. The received message is decrypted with the recipient generated symmetric key based on sender's and his/her device identifier information.

DPEP Process

The DPEP protocol employs a client-server model to authenticate and receive encrypted data.

The receiving end (e.g., Q-Server) listens on a designated port for connections. It is responsible for validating the identity of the sender and his/her device, decrypting the encrypted message. If Q-Server is able to successfully decrypt the data, it knows that message could have only come from the DUF device and its owner.

The client is responsible for sending the encrypted packet to the server, along with clear text of device/sender identifiers.

A DPEP protocol is sessionless communication since it replaces one session key with many DPEP generated packet-level encryption keys.

Negotiating Encryption for the Session

When a TCP/IP packet is sent by a client, the server simply needs to look up client and client owned DUF device identifier and generate decryption key. If the client accurately provided his identifier information, the recipient can generate the matching decryption keys.

With DPEP, both parties negotiated a DUF watermarking solution using series of hash algorithms and tamper resistant hardware solution. This DUF protocol makes it possible for each party to combine their own private data, such as username/password hash and public data, such as time and date of the communication request to arrive at an identical secret key unique to each packet.

The mutual authentication is achieved simply by the fact of receiving end's ability to decrypt the sent data from the client.

According to an embodiment of the disclosure, the DPEP process includes the following steps:

1. Both parties (e.g., client-server model) agree on creating and registering a DUF device identifier agent and associates its identity to existing authentication system, such as username/password system, thereby integrating Q-Server into legacy authentication system.
2. Both parties agree on an encryption generator (typically AES).
3. Using DUF protocol, a unique dynamic hash value is generated from client's DUF device.
4. The input data for generating dynamic hash value may include things like time and date, location, username/password, PIN. For further detail, reference DUF non-provisional patent.
5. This dynamic input data is "processed/DUF watermarked" producing a dynamic but unique hash value.
6. This unique, dynamic hash value is then used as seed value for generating encryption key (AES encryption for example).
7. Sender's data is encrypted using this dynamically generated encryption key.
8. Client packages the encrypted data plus it's clear text version of DUF device identifier and client identifier and sends it to the recipient (i.e., Q-Server).
9. The receiving entity uses their own DUF device (Q-Server), pre-shared secrets such as time of the day, lookup from their legacy authentication system a username/password hash to generate DUF dynamic hash value.
10. This Q-Server generated DUF dynamic hash value is then used as seed value for generating decryption key (i.e., same AES encryption key used by client DUF device).
11. Q-Server uses this newly generated decryption key to decrypt DUF client sent encrypted data.
12. DUF client, when it is ready to send another message, it uses local time, date, location information and the client username/password to generate new encryption seed and repeats the whole DPEP process to securely send and authenticate each encrypted packet.

DUF protocol, when followed, does not share or exchange secret encryption keys. Encryption keys are generated by DUF processing dynamic data and outputting dynamic, always varying hash value. The above process allows each party to equally participate in generating the shared secret, which does not allow one end to control the secret. It also accomplishes the task of generating an identical shared secret without ever having to send that information over to receiving end.

The generated secret is a symmetric key, meaning that the same key used to encrypt a message can be used to decrypt it on the other side. The purpose of this is to wrap all further communication in an encrypted "packet" that cannot be deciphered by outsiders. DPEP removes the need for connection negotiation steps each time two entities need to communicate with each other. It also removes the need for re-issuance of expensive encryption key and identity management process normally associated with traditionally utilized SSL/TLS protocols.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system to provide secure communications between a user and recipient, comprising:
   a user digitally unclonable function (DUF) device comprising a device processor and a device non-transitory memory storing a DUF identifier, wherein the DUF identifier was created by both the user and the recipient independently creating and registering the DUF device identifier at the DUF device and a recipient authentication system;
   the recipient comprising the authentication system comprising an authentication system processor Q-Server and a system non-transitory memory for storing the DUF identifier;
   the DUF device and authentication system each comprising an encryption generator;
   wherein the device process comprises commands to generate a unique, dynamic hash value from dynamic, input data using a DUF protocol, then dynamically generating an encryption key from the unique, dynamic hash value used as a seed value;
   sender data is encrypted using the dynamically generated encryption key;
   a user device packages the encrypted data plus clear text version of the DUF device identifier and a client identifier and sends it to the recipient where it is processed by the authentication system processor Q-Server;
   the recipient uses the authentication system processor Q-Server to generate a Q-Server DUF dynamic hash value;
   the Q-Server generated DUF dynamic hash value is then used as seed value for generating a decryption key, which is the same as the encryption key; and
   the authentication system processor Q-Server uses the decryption key to decrypt DUF client sent encrypted data.

2. The system of claim 1, wherein the existing authentication system is a username/password system.

3. The system of claim 1, wherein the dynamic hash value is generated from input data and a client authentication input.

4. The system of claim 3, wherein the input data is selected from a group consisting of time, date, and location.

5. The system of claim 3, wherein the client authentication input is selected from a group consisting of a username/password and a personal identification number.

6. The system of claim 1, wherein the authentication system processor Q-server generates the DUF dynamic has value using a pre-shared secret and a legacy authentication.

7. The system of claim 6, wherein the pre-shared secret is time of day.

8. The system of claim 6, wherein the legacy authentication is the username/password.

9. The system of claim 1, further comprising:
   the user, when ready to send another message through the user device, uses new input data to generate a new encryption seed and repeats the steps of claim 1 to securely send and authenticate another encrypted packet.

10. The system of claim 1, wherein the client device is selected from the group consisting of a smart phone and a smart watch.

\* \* \* \* \*